(12) United States Patent
Cabrelle et al.

(10) Patent No.: US 9,243,808 B2
(45) Date of Patent: Jan. 26, 2016

(54) ECONOMICAL AND VERSATILE SYSTEM FOR FIXING A HOB IN A WORKSHOP

(71) Applicant: Whirlpool Corporation, Benton Harbor, MI (US)

(72) Inventors: Elio Cabrelle, Comerio (IT); Miraglia Luca, Comerio (IT)

(73) Assignee: Whirlpool Corporation, Benton Harbor, MI (US)

(*) Notice: Subject to any disclaimer, the term of this patent is extended or adjusted under 35 U.S.C. 154(b) by 468 days.

(21) Appl. No.: 13/723,709

(22) Filed: Dec. 21, 2012

(65) Prior Publication Data
US 2014/0110393 A1    Apr. 24, 2014

(51) Int. Cl.
*H05B 3/68* (2006.01)
*F24C 15/10* (2006.01)
*B25B 27/00* (2006.01)

(52) U.S. Cl.
CPC .............. *F24C 15/108* (2013.01); *B25B 27/00* (2013.01); *Y10T 29/53909* (2015.01)

(58) Field of Classification Search
CPC .................. B25B 27/00; F24C 15/108; H05B 3/74–3/748
USPC .......... 219/443.1–468.2; 126/214 A; 248/27.3
See application file for complete search history.

(56) References Cited

U.S. PATENT DOCUMENTS

| | | | | |
|---|---|---|---|---|
| 3,993,272 A * | 11/1976 | Lindeman | | 248/73 |
| 8,944,044 B2 * | 2/2015 | Buck et al. | | 126/214 A |
| 2008/0315201 A1 * | 12/2008 | Ohmi et al. | | 257/59 |
| 2011/0073420 A1 * | 3/2011 | Nagel | | 188/152 |

FOREIGN PATENT DOCUMENTS

GB         2241980 A    9/1991

OTHER PUBLICATIONS

Italian Patent Application IT-VA20110038 filed Dec. 22, 2011, Applicant: Whirlpool, IT search report re: same with mail date of Jul. 9, 2012.

* cited by examiner

*Primary Examiner* — Sang Y Paik

(57) ABSTRACT

A universal cooking hob fixing system for the installation of the cooking hob in a worktop is disclosed. The fixing element has a hooking snap element to the cooking hob support and presents elastic means for keeping the hob into the installed position, suitable to prevent its lifting. The configuration of the hooking snap elements allows the release of the hob by acting from the top side of the installed hob, with a specially shaped tool.

7 Claims, 4 Drawing Sheets

US 9,243,808 B2

ECONOMICAL AND VERSATILE SYSTEM FOR FIXING A HOB IN A WORKSHOP

TECHNICAL FIELD

The present disclosure provides a combination of a fixing element and a support element for a hob in a worktop into which the hob is to be installed.

BACKGROUND

EP 1 977 169 B1 discloses a combination of a fixing element with a support element in which the fixing element comprises a spring and is made up of a substantially planar and linear resilient element, the first end of which is free while the second end is constrained to the support element. The linear arrangement of the spring exhibits the disadvantage of reducing the compression force which the spring is capable of exerting against the structural element in the installed configuration of the hob. This reduced compression force does not effectively prevent the installed hob from lifting from the contact surface of the worktop, which results in infiltration of liquids accidentally spilled on the worktop or used for example during cleaning of the worktop. Moreover, the elongate arrangement of the spring means that the constrained end thereof must be fixed at a level sufficiently below the surface of the worktop to enable the spring to engage effectively and exert its resilient action. This type of limitation entails modifications to the structure of the hobs, especially for those which are of a thinner design, if it is to be possible to use the same fixing element with a variety of models of hob. Furthermore, unlatching of the spring from the wall of the cut surface in the worktop with which the latter is engaged may only be effected from beneath the installed hob. As a consequence, in the event of repair or maintenance of the hob, anything located beneath it (for example an oven built into the same cabinet or drawers) must be removed to provide access.

U.S. Pat. No. 3,386,108 discloses a combination of a support element and a fixing element in which the fixing element is engaged beneath the support element and the installed hob is held in place in the worktop by means of a tie rod which is screwed in under the worktop. Said solution is highly complex and difficult to adapt to the various depths of hobs and work surfaces which are currently distributed commercially.

Finally, GB 2 241 980 A discloses a combination of a fixing element and a support element according to the preamble of the main claim. The fixing element described therein is a resilient element removably fixed to a profile of the hob structure by welding, riveting or by means of screws, so making the solution costly in terms of assembly. Said solution provides a V-shaped resilient element in which one end is constrained and the second is free. A tab-like surface extends from the latter in a substantially orthogonal direction for the purpose of creating a surface which engages with the lower edge of the worktop with the aim of providing resistance to lifting of the hob installed in the worktop.

Said known solution cannot be adapted to the various depths of worktop into which a hob may be installed. It is thus not a "universal" solution. Furthermore, for this hob too, unlatching of the fixing means may only be effected by working from the underside of the worktop.

SUMMARY

The object of the present disclosure is therefore to provide a combination of a fixing element and support element for a hob which overcomes the above-stated disadvantages and is simple and economical to manufacture.

According to the disclosure, said object is achieved thanks to the features set out in the attached claims.

BRIEF DESCRIPTION OF THE DRAWINGS

Further advantages and features of the device according to the disclosure will emerge from the following detailed description, which is provided purely by way of non-limiting example, with reference to the attached drawings, in which.

DETAILED DESCRIPTION

Figure 1:
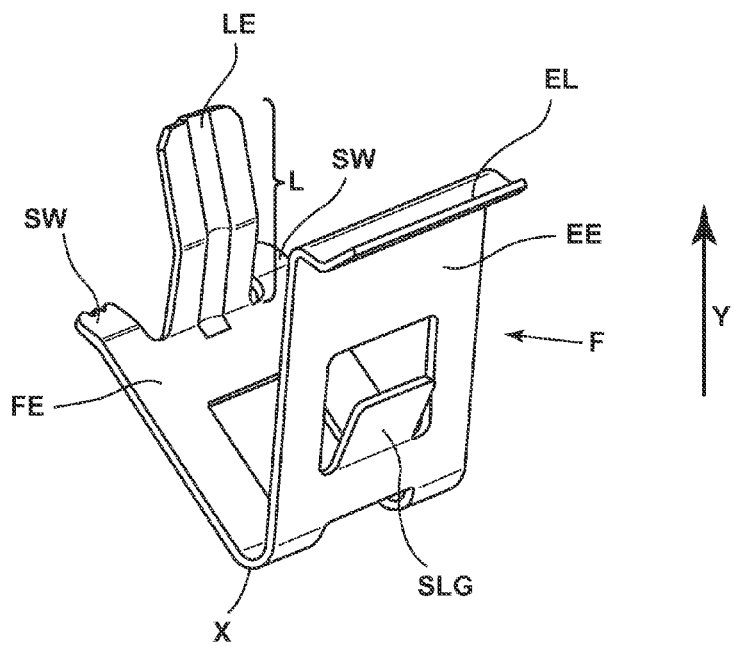
FIGS. 1, 2 and 3 respectively show a perspective view, a side view and a plan view of a preferred configuration of the fixing device of the present disclosure.
Figure 2:
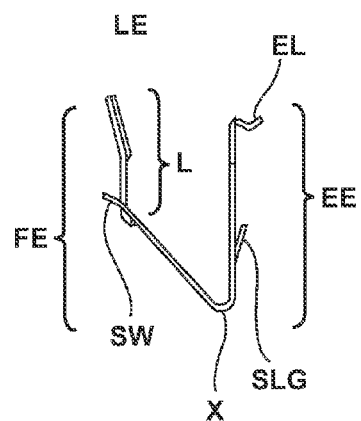

With reference to the above-stated figures, a hob H is described, in particular an electric hob, comprising a sheet G of vitreous ceramic material fixed in known manner to a housing C located therebeneath, the latter being capable of containing both the heating elements and the power supply and control means for said elements.

The sheet G has an upper surface on which the pans are normally placed when foodstuffs are being cooked, and a lower surface L joined to the housing C and concealed from view when the hob is installed in a carrier element W, such as for example a worktop. A sealing gasket (not shown) may be arranged around the periphery of the frame or between the carrier element W of the worktop and the sheet G, to prevent water from getting inside housing C therebeneath.

It is known from the prior art that a worktop W in which the hob H is to be installed has an opening, usually rectangular in shape, into which the hob H is to be inserted and fixed for subsequent use.

The worktop is usually of wood or marble, but may be of synthetic material or be made from a plurality of materials.

The housing C of the hob H is preferably made of metal or plastics material or and has peripheral vertical walls in which are located support elements or portions. According to the disclosure, the housing C is coupled to the carrier element W in which it is installed, by means of at least one support element S, which is in turn coupled to at least one fixing element F.

Advantageously, each support element S is a pocket-like seat P, wherein each pocket is provided with a central strip B for the fixing element F and with two slots HI and LO located at the opposite ends of said central strip B. Advantageously, the central strip B protrudes towards the outside of the housing C relative to the vertical plane of the peripheral wall. In the case of a sheet metal housing, said strip is a region of sheet metal obtained by means of two parallel cuts in the sheet metal and necessarily plastically deformed outwards.

According to a preferred embodiment, the fixing element F comprises a resilient device (EE, X, FE), preferably a V-shaped hook which, when assembled with the support element S, has a free end FE opposite to a constrained end EE and capable of coupling to said support means S. The V-shaped hook preferably comprises a fold X located between said constrained end EE and said free end FE, in which the vertex is in a portion opposite to said ends. In alternative embodiments (not shown), the resilient element E comprises further concertina-like central folds XC (illustrated generally in FIG. 5) in an odd number so that the both free end FE and the constrained end EE are always on the same side relative to the central fold X. The presence of one or more folds between the free end FE and the constrained end EE increases the resilient force which the spring is capable of exerting, in particular against the vertical wall of the incision in the worktop when the support of the component, in particular a hob, is installed therein. This increased force opposes lifting of the hob installed in the worktop, so improving the resistance of the assembly to infiltration by liquids, such as for example those used for cleaning and liquids which overflow accidentally during use of the hob H.

Unlatching of the fixing element F assembled with the support S from the carrier element W, i.e. in the assembled configuration of the combination, is effected by compressing the free end FE of the fixing element F. Compression CX of the free end of the fixing element, shown in FIG. 8, releases the resilient element from engagement against the vertical wall of the incision in the worktop so enabling extraction of the hob from the seat.

According to the disclosure, the free end FE of the fixing element comprises a tab-like portion L which extends substantially in a direction Y parallel to the constrained end. In a preferred embodiment, the tab-like portion L is capable of permitting unlatching of the fixing element F assembled with the support element S of the component from the carrier element W by means of a compression action exerted on said portion L, in particular when the hob is installed in a worktop. The extent and shape thereof are such as to permit latching and compression thereof by bringing the end portion LE thereof closer to the lower surface of the sheet G, during the unlatching operation, but without interfering with said sheet. This arrangement makes it possible to unlatch the fixing element F with access being gained from the upper side U of the carrier element W, the worktop, without there being any need to work from the underside thereof.

Figure 7:
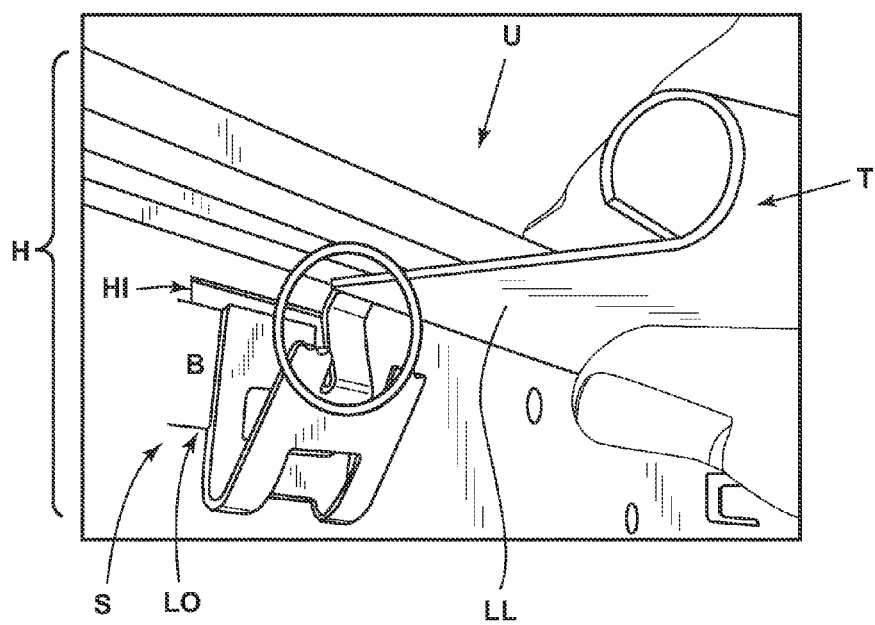
FIG. 7 describes the compression of the resilient element of the fixing device of the preceding figures carried out with a tool which acts on the free end of the fixing element.
Figure 8:
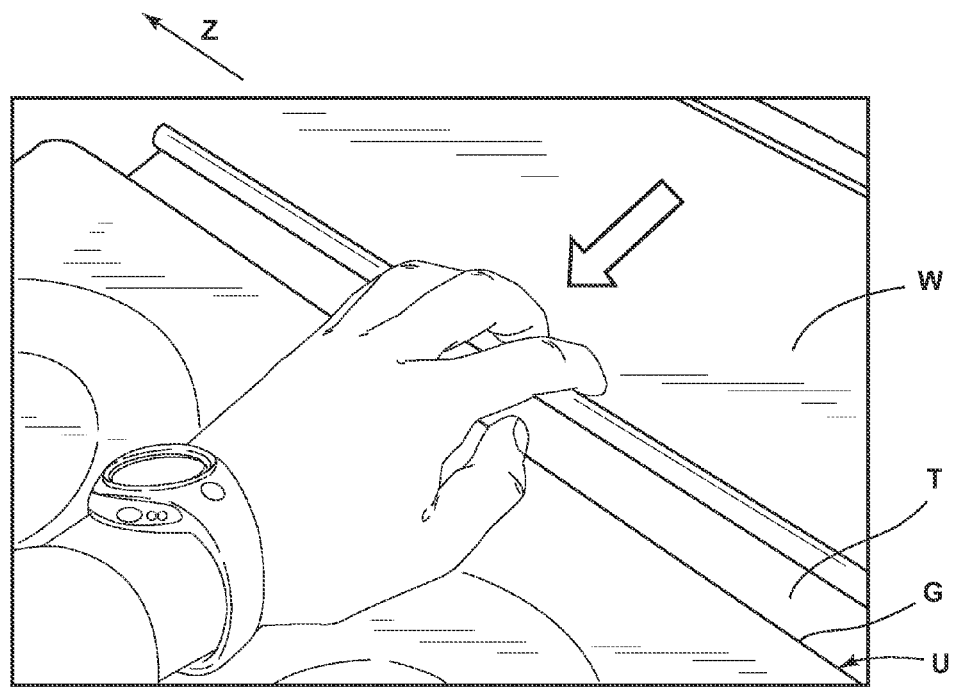
FIGS. 8 and 9 describe the sequence for uninstalling a hob using a tool with a portion having a flat profile.
Figure 9:
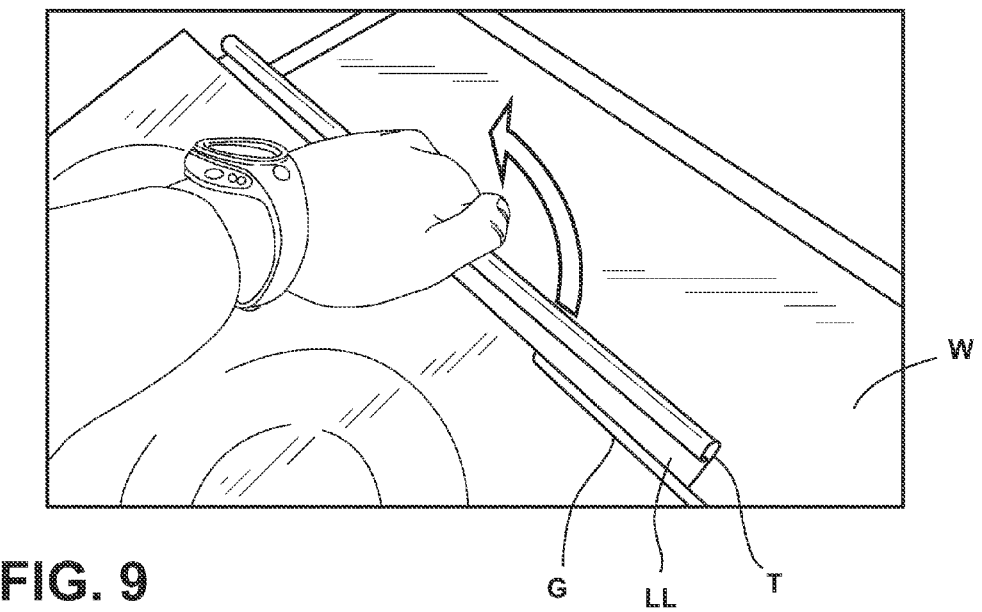

Advantageously, a tool T may be provided for unlatching the fixing element F assembled with the support element S of a component H, in particular for unlatching a hob H from a carrier element W, the latter in particular being a frame which supports or surrounds the hob. Advantageously, the tool T is configured for unlatching a plurality of fixing elements F, in particular being configured so as to be capable of exerting virtually simultaneous compression on a plurality of tabs, preferably arranged in a rectilinear direction Z, as shown in the sequence of FIGS. 7, 8 and 9.

Said tool T preferably has a portion having a flat profile LL, for example a blade, capable of being inserted between the support element of the component S and/or G and/or FR and the worktop W in which it is installed, and is configured for substantially simultaneously compressing a plurality of tabs of said fixing elements.

Figure 3:
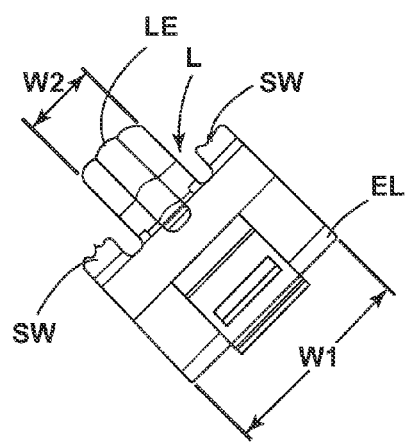

In a preferred embodiment, the free end furthermore comprises means SW for countering lifting of the support element from the carrier element, in the assembled configuration, preferably with a saw-toothed profile, as shown in FIGS. 1 and 3.

Advantageously, coupling between said fixing means F and said support means S may be implemented by applying one or more hooks F to the described pockets P as described below.

Figure 4:
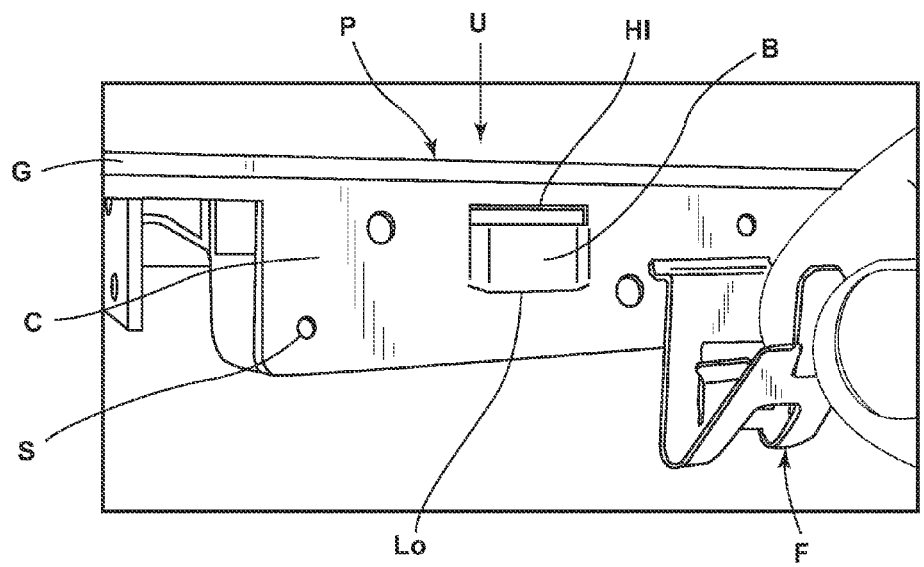
FIG. 4 shows a preferred configuration of the support according to the disclosure with which the fixing device is coupled.
Figure 5:
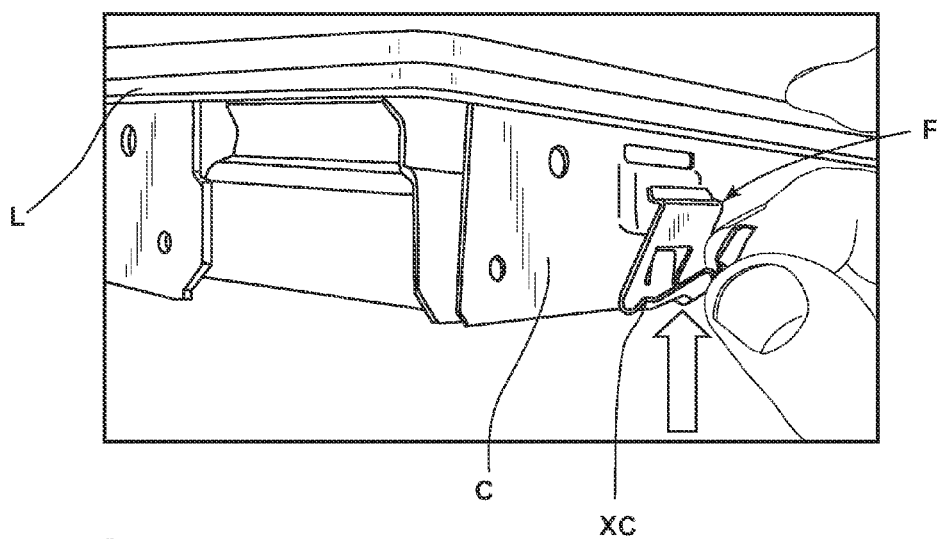
FIGS. 5 and 6 show the operations of connecting the fixing element and the support element described in the preceding figures.
Figure 6:
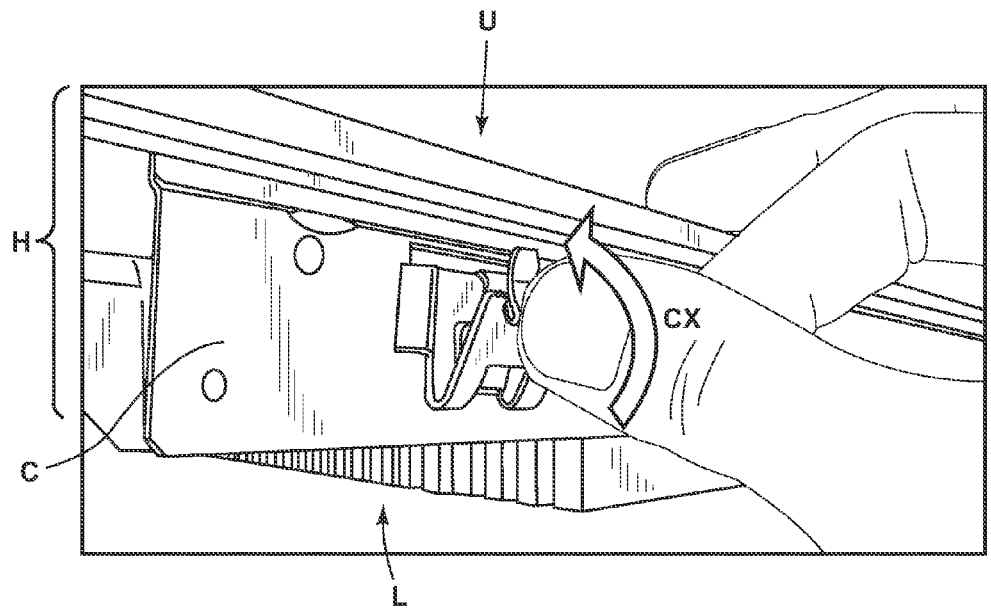

In a preferred configuration of the fixing element, the constrained end thereof incorporates resilient snap-on latching means to said support element S, in particular to the pocket P. Preferably, a protruding element SLG is located in the constrained end EE, which protruding element is capable of being inserted in a slot of the pocket-like seat P, preferably the lower slot LO, and, for latching at the level of a region opposite the pocket P (the upper slot HI in the case shown), a resilient latching element with said central strip B comprising a deformable resilient portion EL. The resilient latching element is opposite to said protruding element SLG and is capable of releasing the hook F, at least on a portion of the central strip, by rotation of the hook around the slide element SLG and by snap-on deformation of a resilient portion EL thereof during coupling with the central strip B. The latching sequence is shown in FIGS. 4, 5 and 6. The fixing element F may preferably be fixed reversibly. In this described configuration, the width W1 of the resilient latching element EL is greater than the width W2 of said tab-like portion L and identical to the width of the free end FE. Other equivalent arrangements are applicable for the same purpose, as are, however, other known reversible coupling methods between the fixing element and the support, such as for example those described in EP 1 977 169, or by means of screws or rivets.

In one preferred variant, the hook is made from spring steel treated against oxidation processes, for example by means of a passivation process such as a burnishing process.

The same device is also applicable to other types of hobs and other built-in household electrical appliances, for example ovens or refrigerators. Further variants of the present disclosure may be obtained by combining the individually described features.

For instance, the combination of a fixing element with a support element in which the fixing element F comprises a resilient fixing element EE, X FE, wherein the fixing element may exert a greater force for countering extraction of the hob H installed in a worktop W, and wherein uninstallation of the installed hob is a rapid procedure for the operator who may work from the upper side U of the hob, without there being any need for further operations to gain access to the lower portion of said hob. Furthermore, the combination according to the disclosure makes it possible to install and fix said hob of a known depth in any currently commercially available worktop. The combination according to the disclosure thus assumes the nature of an economical and universal fixing system.

More generally, a description has been provided of a combination of a fixing element and a support element which is economical and versatile for wider use.

What is claimed is:

1. A fastening component, comprising:
   a cooking hob fastener member;
   a cooking hob support element, wherein the cooking hob fastener element and the cooking hob support element are configured as a combination fastener support element configured to fix a cooking hob to a carrier element, wherein the carrier element is a frame of a worktop surface, the worktop surface supporting and surrounding the cooking hob; and
   an elastic member configured on the fastener member and fixable to said support element, wherein said fastener member, when assembled with the support element, has an engaged end opposite to a free end, and said elastic member presenting a V-shape, wherein the V-shape includes a fold placed between said engaged and free ends in a zone opposite to said ends, said free end allowing the release of the fastener member assembled with the support element of the component from the carrier element by a compression of said free end, said free end includes a tab-shaped portion that extends in a direction substantially parallel to said engaged end, wherein the engaged end includes snap-on elastic elements to said support element, the snap-on elastic elements comprising a protruding element adapted to be inserted in a lower area of a seat of the support element and shaped as a pocket and provided with a central strip, and said snap-on elastic elements further comprising an elastic coupling element with said central strip in an upper area of said seat, said elastic coupling element having a first width, the first width is greater than a second width of said portion shaped as a tab and is equal to a third width of said free end.

2. The fastening component according to claim 1, wherein said tab-shaped portion permits the release of the fastener member assembled with the support element from the carrier element through a compression action exerted on said tab-shaped portion from a top side of said carrier element.

3. The fastening component according to claim 2, further comprising a tool having a flat profile portion configured to compress said portion through said compression action.

4. The fastening component according to claim 1, wherein the free end also includes a saw tooth profile, the saw tooth profile creating a friction against the lifting of the support element from the carrier element in the assembled configuration.

5. The fastening component according to claim 1, wherein the fastener member includes at least one additional fold in a concertina manner, in an odd number.

6. The fastening component according to claim 1, wherein said elastic member is made of spring steel, wherein the spring steel is treated against oxidation by a burnishing process.

7. The fastening component according to claim 1, further comprising a release tool having a compressible laminar portion configure to compress a plurality of free ends of said fastener elements substantially simultaneously.

* * * * *